Patented Feb. 14, 1950

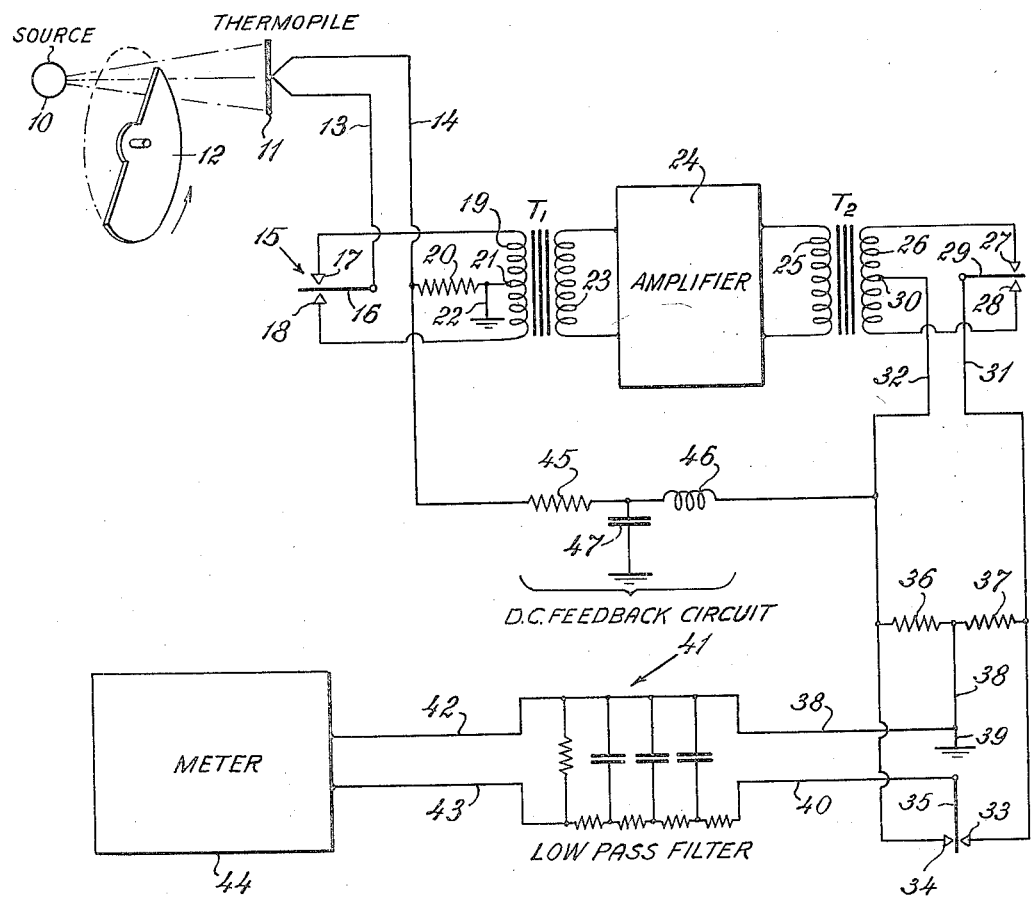

2,497,129

UNITED STATES PATENT OFFICE 2,497,129

RADIATION DETECTING APPARATUS

Max D. Liston, Wilton, Conn., assignor to The Perkin-Elmer Corporation, Glenbrook, Conn., a corporation of New York Application May 2, 1947, Serial No. 745,491

6 Claims. (Cl. 250—83.3)

This invention relates to means for detecting radiant energy and is concerned more particularly with a novel system, which may be employed for determining the presence and location of a source of radiant energy and, if desired, measuring the amount of radiation emanating from such a source. The new system resembles in some respects that disclosed in my co-pending application Serial No. 537,961, filed May 29, 1944, now Patent 2,442,298, but differs therefrom by the inclusion of features which make its use especially advantageous in the infrared region. An embodiment of the invention for use in an infrared spectrometer will, accordingly, be illustrated and described, although it is to be understood that the utility of the invention is not limited to such instruments.

In an infrared spectrometer, the amount of light at each point in a spectrum of infrared light, which has passed through the sample to be analyzed, is measured by its heating effect on a thermopile. The thermopile generates voltages in response to the rays falling thereon and the voltages are amplified and produce currents that can be indicated and measured by a meter. Since the voltages developed by the thermopile lie in the microvolt and fractional microvolt region, provision must be made for eliminating the effect of stray thermo-potentials which might otherwise introduce large errors into the reading of the instrument.

In the system of the patent, the effect of stray rays is eliminated by intercepting the light from the source at regular intervals and at a low frequency, so that the thermopile produces low frequency voltage pulses. The voltages generated by the thermopile are amplified by a breaker type of amplifier, in which the current produced by the thermopile voltages is periodically interrupted at a frequency much higher than that at which the rays are intercepted, the interrupted current then passing to an input transformer, an amplifier, and an output transformer. Beyond the output transformer, the amplified current is rectified by means operating at the frequency of and in timed relation to the interrupter, and the rectified current, pulsating at the frequency of the intercepting means, passes to a band pass filter, which passes only current of that frequency. The current then flows to the primary of a transformer, the secondary of which is connected to a rectifying device operating at the frequency of the intercepting means, and the rectified current then flows to a meter.

The system of my patent is satisfactory for uses in which the detecting element responds rapidly, so that the light intercepting means may operate at a fairly high frequency. Difficulties are encountered, however, in employing the system in the infrared region, because the slow acting thermopile used requires so low a frequency of interception, as, for example, 15 cycles per second or less, that it is virtually impossible to obtain transformers which function efficiently at such frequencies.

The present invention is directed to the provision of a detecting system that may be advantageously employed in the infrared field, and includes means for eliminating the effect of stray rays that may fall upon the thermopile, and a novel amplifying means, which functions efficiently in the fractional microvolt region. In the new system, the light from the source is intercepted at regular intervals and at a low frequency so that the thermopile produces low frequency voltage pulses, but no transformer operating at such a low frequency is required. In order to overcome the flicker noise present in electronic tubes at the low frequency and to prevent the grid blocking that would be caused by the extremely high R. C. ratio required to pass such a frequency in a capacity-resistance coupled amplifier, I employ a breaker type of amplifier for amplifying the voltages generated by the thermopile. Beyond the amplifier, the current is rectified by means operating at the frequency of and in timed relation to the light intercepting means, and thereafter passes through a low pass filter to a meter. In order to avoid blocking of the amplifier resulting from large D. C. voltages superimposed upon the low frequency voltage generated by the thermopile, a D. C. degenerative feedback circuit is provided and this circuit effects a large reduction in the D. C. gain in the amplifier without affecting the gain at the frequency of the voltages produced by the intercepted light from the source.

For a better understanding of the invention, reference may be made to the accompanying drawing, in which the single figure is a circuit diagram of one form of the new system.

The system of the invention in a form suitable for use in an infrared spectrometer includes a suitable source 10 of infrared rays, which fall upon a thermopile 11 sensitive to the rays and generating a voltage in response thereto. A light chopper 12, illustrated as a semi-circular disk, is mounted between the source and the thermopile and is rotated at a slow speed, for example, five revolutions per second. During one half of each rotation of the chopper, the rays strike the thermopile, so that a voltage is developed and, during the other half of the rotation of the chopper, it intercepts the rays.

The thermopile is connected by lines 13 and 14 to a breaker type of amplifier, which includes an interrupter 15. The interrupter comprises a movable arm 16 between fixed contacts 17, 18, and the line 13 is connected to the arm. The contacts 17, 18 are connected to opposite ends of the primary winding 19 of a transformer $T_1$, and the line 14 is connected through a resistance 20 to a center tap 21 on the primary winding. A ground connection 22 leads from the connection between resistance 20 and the center tap 21.

The secondary 23 of transformer $T_1$ is connected to a conventional vacuum tube amplifier 24 and the output of the amplifier is connected to the primary 25 of a second transformer $T_2$. The secondary winding 26 of transformer $T_2$ is connected to fixed contacts 27, 28, between which operates a vibratory interrupter arm 29. The arms 16 and 29 operate in timed relation and at the same frequency, which is much higher than the frequency with which the light rays are intercepted.

The arm 29 and center tap 30 on the secondary 26 are connected by lines 31, 32 to a low frequency breaker, which consists of fixed contacts 33, 34 to which lines 31, 32, respectively, lead, and a movable arm 35, which lies between the contacts. The arm vibrates in timed relation to the light chopper and at the same frequency, so that, when rays from the source strike the thermopile, the arm 35 is in engagement with one of the contacts and, when the rays are cut off, the arm engages the other contact.

A pair of like resistances 36, 37 are connected across the lines 31, 32, and line 38, grounded at 39, leads from the midpoint of the connection between the resistances. Line 38 and a line 40 connected to the vibratory arm 35 are connected to a low pass filter 41, and lines 42, 43 lead from the filter to an indicating device, such as a meter 44.

In the operation of the system so far described, current flowing from the thermopile, because of the rays from the source falling thereon, is interrupted at high frequency by the action of the arm 16 moving between contacts 17, 18. When the arm 16 is in engagement with contact 17, current flows through the upper half of primary 19 and, when arm 16 engages contact 18, current flows through the lower half of the primary. The oscillation of the arm 16 between the contacts thus causes the halves of primary 19 to be alternately energized with the current flowing in opposite directions therethrough, and this induces an alternating current in the secondary winding 23 of the transformer, the current being of a high frequency dependent upon the speed with which the arm 16 moves back and forth.

The high frequency alternating current is amplified by amplifier 24 and the output of the amplifier is supplied to the primary 25 of the transformer $T_2$, and induces alternating current in the secondary 26 thereof. The output from the secondary 26 is interrupted by the vibration of arm 29 between contacts 27, 28, in timed relation and at the same frequency as the vibration of arm 16. Accordingly, when current is passing in one direction through the secondary 26, one half of the winding is connected in the output circuit, and when current is passing in the other direction through the secondary, the other half of the winding is in circuit. As a result, the current leaving the secondary is rectified to its original form, as it left the thermopile, and then flows to contacts 33, 34.

The breaker arm 35 vibrating between contacts 33, 34 at the frequency of interception of the rays by the chopper and in timed relation thereto, rectifies the current and direct current is supplied to the low pass filter 41. In the filter, the noise and frequency components generated by the amplifier and induced noise components, which have passed at high frequency through the low frequency breaker, are eliminated. Also, D. C. voltage components resulting from stray rays falling upon the thermopile and not modulated by the chopper will have been converted to low frequency A. C. voltage by the action of the breaker, and such components will be eliminated by the filter. Accordingly, the current supplied to the meter will be that resulting from the low frequency components produced by the interception of the rays from the source by the chopper and converted to D. C. by the action of the breaker. The meter will, therefore, indicate the quantity of radiation from the source that falls upon the thermopile and stray rays reaching the thermopile will not produce an error in the reading.

Under some conditions of operation, stray rays falling upon the thermopile may cause a large D. C. voltage to be superimposed upon the low frequency voltage produced by the action of the rays from the source. Such a D. C. voltage may be so large, that, if amplified to the same degree as the low frequency voltage, it will block the amplifier. In order to prevent this, a D. C. degenerative feedback circuit is connected between line 32 and the end of resistance 20 remote from the center tap 21 of primary winding 19. The circuit includes resistance 45 and inductance 46 in series and a ground connection containing capacity 47. The feedback circuit has a long time constant, such that the D. C. gain in the amplifier can be reduced by a factor of 200 or more, while the gain at the desired low frequency is not effected.

The new detecting system is particularly useful in the infrared field, where the low frequency, at which the light must be chopped because of the slow detectors used, would make conventional electronic amplification difficult. By employing the breaker type of amplifier, the thermopile output can be amplified at high frequency, so that it is easy to obtain transformers which operate efficiently and difficulties arising from flicker noises in the tubes can be avoided. By the use of the feedback circuit, it is possible to reduce the D. C. gain of the amplifier by from 200 to 1,000 times without disturbing the gain at the low chopping frequency and thus the effects of stray drifts from the thermopile, which have been found to be occasionally of such magnitude as to block the amplifier and make the system unusable, are eliminated.

I claim:

1. In a detecting means, the combination of a source of rays, an element receiving rays from the source and generating a voltage in response thereto, a member interposed between the source and the element and operating to intercept the rays at a low and uniform frequency, an interrupter in circuit with the element and periodically interrupting the current produced by the voltage generated by the element, means receiving the interrupted current and amplifying it, a rectifying device receiving the output from the amplifying means and operating in timed relation to the interrupter to cause the voltage generated by the element to be reproduced although amplified, a second rectifying device directly receiving substantially the entire unaltered output of the first rectifying device and operating in timed relation with and at the same frequency as the member to cause the voltage generated by the element in response to the rays to produce a direct current output, and filter means connected to and receiving the entire output of the second rectifying device and passing said direct current output only.

2. In a detecting means, the combination of a source of rays, an element receiving rays from the source and generating a voltage in response thereto, a member interposed between the source and the element and operating to intercept the rays at a low and uniform frequency, an interrupter in circuit with the element and periodically interrupting the current produced by the voltage generated by the element, means receiving the interrupted current and amplifying it, a rectifying device receiving the output from the amplifying means and operating in timed relation to and at the frequency of the interrupter to cause the voltage generated by the element to be reproduced although amplified, a second rectifying device in circuit with the first rectifying device and operating in timed relation with and at the same frequency as the member to cause the voltage generated by the element in response to the rays to produce a direct current output, negative feedback means connecting the output of the first rectifying means to the output of the element and including filter means for passing direct current only, said feed-back means substantially reducing the direct current output of the element, and filter means connected to the second rectifying means and passing direct current only.

3. In a detecting means, the combination of a source of rays, an element receiving rays from the source and generating a voltage in response thereto, a member interposed between the source and the element and operating to intercept the rays at a low and uniform frequency, an interrupter in circuit with the element and periodically interrupting the current produced by the voltage generated by the element, means receiving the interrupted current and amplifying it, a rectifying device receiving the output from the amplifying means and operating in timed relation to and at the frequency of the interrupter to cause the voltage generated by the element to be reproduced although amplified, a second rectifying device directly receiving substantially the entire unaltered output of the first rectifying device and operating in timed relation with and at the same frequency as the member to cause the voltage generated by the element in response to the rays to produce a direct current output, filter means connected to and receiving the entire output of the second rectifying device and passing said direct current output only, and an indicating device energized by current passing through the filter means.

4. In a detecting means, the combination of a source of rays, an element receiving rays from the source and generating a voltage in response thereto, a member interposed between the source and the element and operating to intercept the rays at a low and uniform frequency, an interrupter in circuit with the element and periodically interrupting the current produced by the voltage generated by the element, means receiving the interrupted current and amplifying it, a rectifying device receiving the output from the amplifying means and operating in timed relation to and at the frequency of the interrupter to cause the voltage generated by the element to be reproduced although amplified, contactor rectifying means directly receiving substantially the entire unaltered output of the rectifying device and operating in timed relation with and at the same frequency as the member to cause the voltage generated by the element in response to the rays to produce a direct current output, and filter means connected to and receiving the entire output of the contactor rectifying means and passing said direct current output only.

5. In a detecting means, the combination of a source of rays, an element receiving rays from the source and generating a voltage in response thereto, a light chopper operating at a low and uniform frequency to cut off the rays and prevent them from reaching the element, an interrupter in circuit with the element and periodically interrupting the current from the element at a frequency substantially higher than that of the light chopper, means connected to the interrupter and amplifying the interrupted current, a rectifying device receiving the output from the amplifying means and operating in timed relation to and at the frequency of the interrupter to cause the voltage generated by the element to be reproduced although amplified, a breaker directly receiving substantially the entire unaltered output of the rectifying device and operating in timed relation with and at the same frequency as the light chopper to cause the voltage generated by the element in response to the rays to produce a direct current output, and filter means connected to and receiving the entire output of the breaker and passing said direct current output only.

6. In a detecting means, the combination of a source of rays, an element receiving rays from the source and generating a voltage in response thereto, a light chopper operating at a low and uniform frequency to cut off the rays and prevent them from reaching the element, an interrupter in circuit with the element and periodically interrupting the current from the element at a frequency substantially higher than that of the light chopper, means connected to the interrupter and amplifying the interrupted current, a rectifying device receiving the output from the amplifying means and operating in timed relation to and at the frequency of the interrupter to cause the voltage generated by the element to be reproduced although amplified, a breaker connected to the rectifying device and operating in timed relation to and at the frequency of the light chopper to cause the voltage generated by the element in response to the rays to produce a direct current output, negative feedback means connecting the output of the rectifying device and the output of the element, the negative feedback means passing direct current only and operating to effect a substantial reduction in the direct current output of the element, and filter means connected to the breaker and passing only direct current received therefrom.

MAX D. LISTON.

REFERENCES CITED

The following references are of record in the file of this patent:

UNITED STATES PATENTS

| Number | Name | Date |
|---|---|---|
| 1,378,712 | Milnor | May 17, 1921 |
| 2,114,298 | Gunn | Apr. 19, 1938 |
| 2,297,543 | Eberhart et al. | Sept. 29, 1942 |
| 2,413,788 | Sargeant et al. | Jan. 7, 1947 |
| 2,442,298 | Liston | May 25, 1948 |

FOREIGN PATENTS

| Number | Country | Date |
|---|---|---|
| 671,864 | Germany | Feb. 17, 1939 |